United States Patent
Kahrobaei et al.

(10) Patent No.: US 9,825,926 B2
(45) Date of Patent: Nov. 21, 2017

(54) METHOD AND APPARATUS FOR SECURE DELEGATION OF COMPUTATION

(71) Applicant: Research Foundation of the City University of New York, New York, NY (US)

(72) Inventors: Delaram Kahrobaei, New York, NY (US); Bren Cavallo, New York, NY (US); Vladimir Shpilrain, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 80 days.

(21) Appl. No.: 14/794,969

(22) Filed: Jul. 9, 2015

(65) Prior Publication Data

US 2016/0057119 A1     Feb. 25, 2016

Related U.S. Application Data

(60) Provisional application No. 62/030,802, filed on Jul. 30, 2014.

(51) Int. Cl.
*H04L 29/06* (2006.01)
*H04L 9/30* (2006.01)
*H04W 12/02* (2009.01)
*H04W 12/04* (2009.01)

(52) U.S. Cl.
CPC ............ *H04L 63/061* (2013.01); *H04L 9/302* (2013.01); *H04L 63/0428* (2013.01); *H04L 2209/805* (2013.01); *H04W 12/02* (2013.01); *H04W 12/04* (2013.01)

(58) Field of Classification Search
CPC ............ H04L 63/061; H04L 9/302; H04L 2209/805; H04L 63/0428; H04W 12/02; H04W 12/04
USPC ......................................... 713/171
See application file for complete search history.

(56) References Cited

U.S. PATENT DOCUMENTS 4,405,829 A    9/1983  Rivest et al.
6,779,111 B1 *  8/2004  Gehrmann ............. H04L 9/302
                                              380/259

OTHER PUBLICATIONS

Hohenberger, Susan, and Anna Lysyanskaya. "How to securely outsource cryptographic computations." Theory of Cryptography Conference. Springer Berlin Heidelberg, 2005.*
Boyko et al.; Speeding up Discrete Log and Factoring Based Schemes via Precomputations; Advances in Cryptology—Eurocrypt'98; Lecture Notes in Computer Science vol. 1403, 1998, pp. 221-235.

(Continued)

*Primary Examiner* — Yogesh Paliwal
(74) *Attorney, Agent, or Firm* — Peter J. Mikesell; Schmeiser, Olsen & Watts, LLP

(57) ABSTRACT

A method for delegating a computational burden from a computationally limited party to a computationally superior party is disclosed. Computations that can be delegated include inversion and exponentiation modulo any number m. This can be then used for sending encrypted messages by a computationally limited party in a standard cryptographic framework, such as RSA. Security of delegating computation is not based on any computational hardness assumptions, but instead on the presence of numerous decoys of the actual secrets.

19 Claims, 2 Drawing Sheets

(56) References Cited

OTHER PUBLICATIONS

Chen et al.; New Algorithms for Secure Outsourcing of Modular Exponentiations; IEEE Transactions on Parallel and Distributed Systems, vol. 25, No. 9, Sep. 2014; pp. 2386-2396.
Clarke et al.; Speeding up Exponentiation using an Untrusted Computational Resource; Computer Science and Artificial Intelligence Laboratory; Aug. 28, 2003; Memo 469; Massachusetts Institute of Technology.
Hohenberger et al.; How to Securely Outsource Cryptographic Computations; TCC'05 Proceedings of the Second international conference on Theory of Cryptography; Feb. 10, 2005; pp. 264-282; Springer-Verlag Berlin.

\* cited by examiner

METHOD AND APPARATUS FOR SECURE DELEGATION OF COMPUTATION

CROSS-REFERENCE TO RELATED APPLICATIONS

This application claims priority to and is a non-provisional of U.S. Patent Application Ser. No. 62/030,802 (filed Jul. 30, 2014) the entirety of which is incorporated herein by reference.

STATEMENT OF FEDERALLY SPONSORED RESEARCH OR DEVELOPMENT

This invention was made with Government support under Contract number DMS-0914778 awarded by the National Science Foundation (NSF) and Contract number N000141210758 awarded by the Office of Naval Research (ONR). The government has certain rights in the invention.

BACKGROUND OF THE INVENTION

The subject matter disclosed herein relates to delegation of computational burden to another party, where security is based not on any computational assumptions but on the presence of numerous "decoys" of private information.

Many small devices, such as radio frequency identification (RFID) tags, electronic key fobs, and field-programmable gate arrays (FPGAs) have limited computational power. Despite the limited computational power, users often want these small devices to securely transmit encrypted data. Unfortunately, the limited computation power of these small devices limits their ability to utilize encryption protocols. An improved method for permitting small devices with limited computational power to utilize encryption protocols is therefore desired.

The discussion above is merely provided for general background information and is not intended to be used as an aid in determining the scope of the claimed subject matter.

BRIEF DESCRIPTION OF THE INVENTION

A method for delegating a computational burden from a computationally limited party to a computationally superior party is disclosed. Computations that can be delegated include inversion and exponentiation modulo any number m. This can be then used for sending encrypted messages by a computationally limited party in a standard cryptographic framework, such as RSA. Security of delegating computation is not based on any computational hardness assumptions, but instead on the presence of numerous decoys of the actual secrets.

In a first embodiment, a method for delegating computational burden between a sending party and a receiving party for encrypting a message x with a key k to produce an encrypted message $x^k$ where the message x is an element of a list of integers ($\mathbb{Z}_m$) is disclosed. The method comprises steps of instructing the receiving party to identify n elements ($x_i, \ldots x_n$) from the list of integers ($\mathbb{Z}_m$) having elements $x_1, \ldots, x_m$, wherein n is greater than log log (k), greater than zero and is less than m, k is a key known by at least the receiving party that is greater than zero and less than m, wherein the step of instructing is performed by the sending party; getting from the receiving party a list of the n elements ($x_i \ldots x_n$) that were identified; confirming, for each $x_i$, that $$\frac{m}{2n} \leq x_{i+1} - x_i \leq \frac{m}{n}$$

is satisfied; choosing r random elements $x_{i_j}$ from the list of the n elements ($x_i \ldots x_n$) that were identified, wherein $1 \leq r \leq \log \log(k)$ to produce a list of randomly chosen elements $1 \leq i_1, \ldots, i_r \leq n$; computing $y = xx_{i_1}^{-1} x_{i_2}^{-1} \ldots x_{i_r}^{-1}$ wherein $x_{i_1}^{-1} x_{i_2}^{-1} \ldots x_{i_r}^{-1}$; sending y to the receiving party; obtaining $y^k$ from the receiving party; and encrypting the message x with the key k according to $x^k = x_{i_1}^k \ldots x_{i_r}^k y^k$ wherein $y^k$ was obtained by the sending party from the receiving party in the step of obtaining.

In a second embodiment, a method for delegating computational burden between a sending party and a receiving party for encrypting a message x with a key k to produce an encrypted message $x^k$ where the message x is an element of a list of integers ($\mathbb{Z}_m$). The method comprises steps of instructing the receiving party to identify n elements ($x_i \ldots x_n$) from the list of integers ($\mathbb{Z}_n$) having elements $x_1 \ldots x_m$, wherein n is greater than log log (k), greater than zero and is less than m, k is a key known by at least the receiving party that is greater than zero and less than m, wherein the step of instructing is performed by the sending party, wherein the sending party is selected from the group consisting of a radio frequency identification (RFID) tag, an electronic key fob, and a field-programmable gate array (FPGA); getting from the receiving party a list of the n elements ($x_i \ldots x_n$) that were identified; confirming, for each $x_i$, that $$\frac{m}{2n} \leq x_{i+1} - x_i \leq \frac{m}{n}$$

is satisfied; choosing r random elements $x_{i_j}$ from the list of the n elements ($x_i \ldots x_n$) that were identified, wherein $1 \leq r \leq \log \log(k)$ to produce a list of randomly chosen elements $1 \leq i_1, \ldots, i_r \leq n$; computing $y = xx_{i_1}^{-1} x_{i_2}^{-1} \ldots x_{i_r}^{-1}$ wherein $x_{i_1}^{-1} x_{i_2}^{-1} \ldots x_{i_r}^{-1}$; sending y to the receiving party; obtaining from the receiving party $y^k$; encrypting the message x with the key k according to $x^k = x_{i_1}^k \ldots x_{i_r}^k y^k$ wherein $y^k$ was obtained by the sending party from the receiving party in the step of obtaining.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
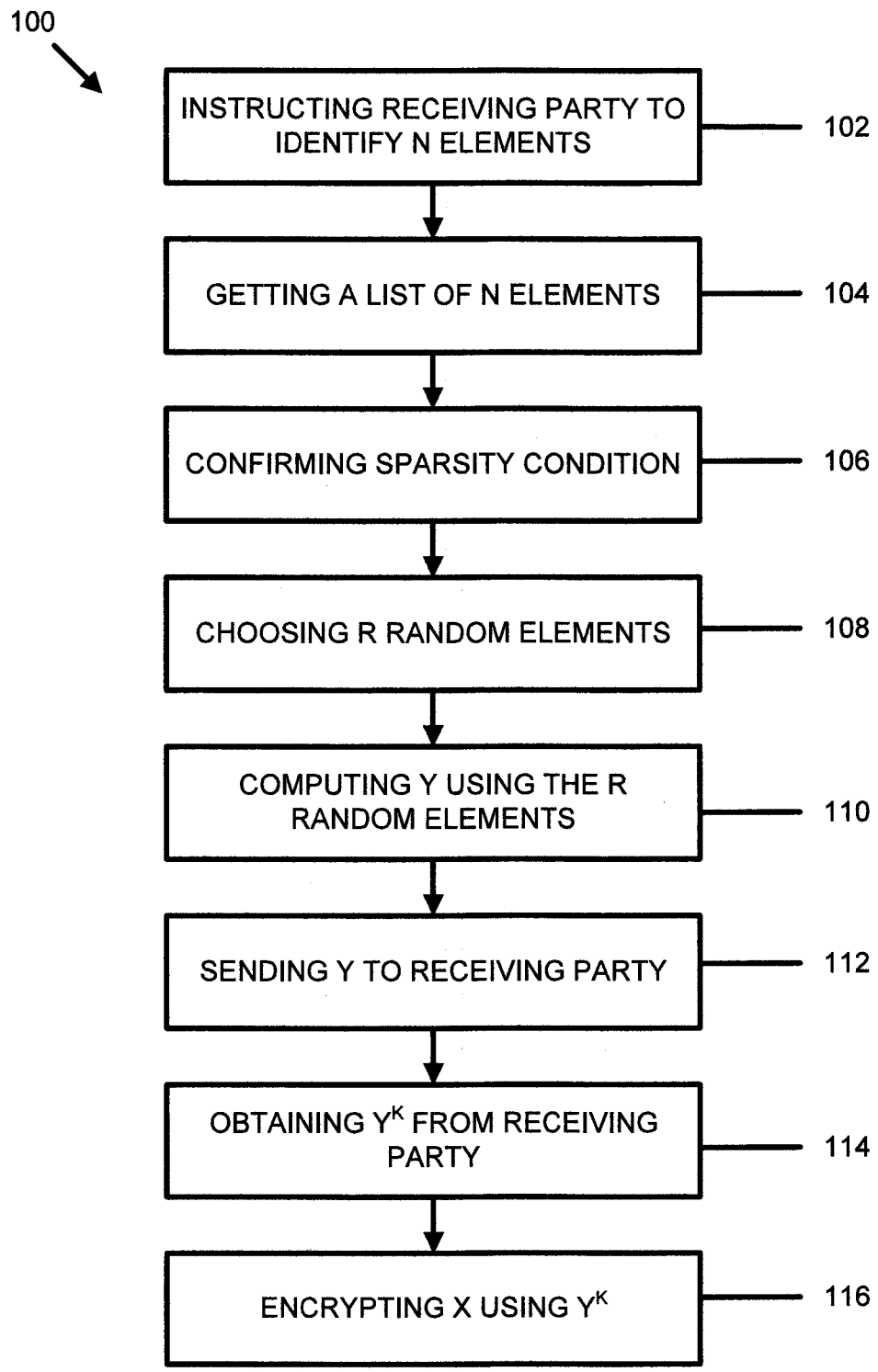
FIG. 1 is a flow diagram of a method for encrypting a message.

Disclosed in this specification is a method wherein a computationally limited party (sender) sends an encrypted message to a computationally superior party (receiver) using, for example, a Rivest Shamir Adleman (RSA) protocol. The disclosed method improves efficiency for the sender by several orders of magnitude compared to a corresponding method that utilizes the RSA protocol. Due to this efficiency, the method is therefore desirable for protecting information transmitted by small chips/gadgets like RFID tags, FPGAs, key fobs, etc. In contrast, other protocols for delegation of computation typically use one-way functions to provide security of private data, which limits their efficiency. Also, they are vulnerable to various attacks unless private keys are of a sufficiently large size, which again affects the efficiency. The disclosed method (1) is orders of magnitude more efficient than existing protocols for delegation of computation; (2) secures private data without relying on any computational assumptions, which makes the disclosed method secure even against a computationally unbounded adversary. In view of the foregoing, embodiments of the method shift a portion of the computational burden for encryption onto the party with superior computational power. A technical effect is to permit parties with limited computational power to achieve a relatively high degree of encryption.

The disclosed method utilizes decoy-based security. Instead of confronting an adversary with a computationally difficult problem that must be solved to decrypt a secret plaintext, just give the adversary a pile of possible (not necessarily equally possible) plaintexts, such that the probability for the adversary to pick the "real one" based on all available information does not exceed some predetermined probability that is accepted as negligible.

In one embodiment, a RSA protocol is used. RSA protocol encrypts a plaintext m (which is an element of a ring $\mathbb{Z}_n$). The sender raises m to a large power. For strong security, this power can be on the order of 2048 bits. With the "square-and-multiply" method for exponentiation, this will require between 2048 and 2048.12 multiplications, depending on the Hamming distance from the exponent to the nearest power of 2. There is also reduction modulo n involved after almost every squaring, which does not necessarily require many multiplications in $\mathbb{Z}_n$, but then there is some pre-computation involved that brings extra log n multiplications. In the above example there will be roughly $2 \cdot 10^4$ multiplications (and about $2 \cdot 10^6$ additions) in $\mathbb{Z}_n$, which may be too much for a computationally limited device like a car key, an RFID tag, or an FPGA. With the disclosed method, the sender can delegate most of the computation, including the above mentioned pre-computation, to the receiver (who is typically computationally superior) and perform under 30 multiplications (and about 3,000 additions), depending on how many decoys the sender uses, which in turn depends on what probability of picking the actual secret from a number of decoys is agreed upon to be negligible. Thus, the disclosed method improves the efficiency for the sender by several orders of magnitude.

An example of the disclosed method follows. Alice (a computationally limited sender) wants to encrypt a message x with a key k to produce an encrypted message $x^k$, where the message x is an element of a list of integers ($\mathbb{Z}_m$) for some large m. In this example 0<k<m is so large that Alice lacks the computational power to perform the encryption. Accordingly, Alice delegates some of the computations to Bob (a computationally superior receiver).

Referring to FIG. 1 and method 100 disclosed therein, in step 102 Alice instructs Bob to identify n distinct invertible elements ($x_i \ldots x_n$) from the list of integers ($\mathbb{Z}_m$) having elements $x_i \ldots x_m$, wherein n is greater than log log (k) and is less than m. For each i, $$\frac{m}{2n} \le x_{i+1} - x_i \le \frac{m}{n}.$$

In other words $x_i$ is sufficiently sparse. If $x_i$ is not sufficiently sparse, Alice may instruct Bob to identify different elements until the sufficiently sparse condition is satisfied. Without loss of generality, n may be assumed to be invertible in $\mathbb{Z}_m$.

In step 104, Bob then identifies n distinct invertible elements from the list of integers ($\mathbb{Z}_m$). Alice thereafter gets, from Bob, a list of the n elements that were identified. At some point during the method, a confirmation step 106 is performed that ensures, for each $x_i$, that the sparsity condition $$\frac{m}{2n} \le x_{i+1} - x_i \le \frac{m}{n}$$

is satisfied. In one embodiment, Alice performs the confirmation step.

In step 108 Alice then chooses r random elements $x_{i_j}$ from the list of n elements ($x_i \ldots x_n$) that were identified, wherein $1 \le r \le \log \log(k)$ to produce a list of randomly chosen elements $1 \le i_1, \ldots, i_r \le n$. In step 110, Alice computes $y = x x_{i_1}^{-1} x_{i_2}^{-1} \ldots x_{i_r}^{-1}$ and, in step 112, sends y to Bob. Bob encrypts y with the key k to produce $y^k$. In step 114 Alice receives $y^k$ from Bob. In step 116 Alice encrypts the message x according to $x^k = x r y^k$.

In one embodiment, the computation of inverses of elements modulo m is delegated. For example, Alice may wish to find the inverse of $x \in \mathbb{Z}_p$. Using the Euclidean algorithm this takes $O(\log^2 p)$ multiplications. Alice first chooses a random $c \in \mathbb{Z}_p$ and sends $y = xc$ to Bob. Bob then computes $x^{-1}$ and sends it to Alice. Alice finds $x^{-1} = cy^{-1} = c(c^{-1}x^{-1})$. This operation uses two multiplication operations on Alice's part. The message x remains well hidden if c is chosen uniformly randomly. This is true because, as far as Bob or any third party is concerned, there are many (equally likely) possibilities (decoys) for x based on the transmitted xc.

Using the disclosed method, Alice need only do 2n multiplications in $\mathbb{Z}_m$. The magnitude of n depends on how many decoys for her message x Alice would like to have. In an embodiment where Alice is the sender of message x using the RSA protocol, the parties perform computations in $\mathbb{Z}_m$ wherein m=pq is a product of two large primes. If p and q have 1024 bits, then m has 2048 bits and log log (m) is 11. Accordingly, a typical n in this embodiment would be between 20 and 30.

Security

The security provided by the method relies on the fact that Bob, or any eavesdropper, will be facing many possibilities for x because of the many possible ways for Alice to build x out of $x_i$ and y. Out of n public potential factors of x only at most log log (k) are "true factors." Any choice of less than log log (k) of the $x_i$ would correspond to a potential x. Each potential x is a decoy. As Alice chooses a larger n, the number of decoys increases upper-linearly. Hence, for a reasonably large n, the probability of guessing x is small enough to be considered negligible.

To computer the total number of decoys, one may counter the number of ways to choose r elements from n, with repetitions allowed. See equation (1):

$$\binom{n+r-1}{r} = \frac{(n+r-1)(n+r-2)\ldots(n+1)n}{r!}$$

If r is fixed and n is varied, equation (1) becomes a degree r polynomial in n. If r is varied over 1 through log log (k) equation (1) becomes equation (2) to give the total number of decoys. See equation (2):

$$\sum_{r=1}^{\log\log(k)} \binom{n+r-1}{r}$$

Fixing k and varying n, this sum is a polynomial of degree log log (k) in n. Therefore the number of decoys is $O(n^{\log\log(k)})$. Table 1 provides some exact values of the number of decoys for some particular n with $k=2^{2048}$.

TABLE 1

| n | # decoys |
|---|---|
| 10 | $352715 \approx 3 \cdot 10^4$ |
| 20 | $84672314 \approx 8 \cdot 10^7$ |
| 30 | $3159461967 \approx 3 \cdot 10^9$ |
| 40 | $47626016969 \approx 5 \cdot 10^{10}$ |
| 50 | $418094152865 \approx 4 \cdot 10^{11}$ |

No additional information about x is leaked during execution of the method Note that $x_i$ are chosen (by Bob) independently of x, so no information about x can possibly be leaked at this step. The only possible step to leak information about x is the step where Alice sends y to Bob. However, since $x_i$ to unknown to Bob or any eavesdropper and is chosen uniformly at random from $\mathbb{Z}_m$ to begin with, y is also distributed uniformly in $\mathbb{Z}_m$ and therefore cannot leak any information about x.

Complexity

The disclosed method permits Alice to logarithmically perform many multiplications compared to what she would do if she were computing $x^k$ by herself without Bob. To compute $x^k$, the fastest method Alice can use on her own is the "square-and-multiply" method, in which case she would perform between log (k) and log (k) log (k) multiplications, depending on k. This is without taking into account the complexity of reductions modulo m.

With Bob's help, Alice performs approximately log log (k) multiplications when she computes y. Alice performs another log log (k) multiplications when she encrypts the message x according to $x^k = x_{i_1}^k \ldots x_{i_r}^k y^k$. Therefore, Alice performs logarithmically many multiplications compared to what she would without Bob's help (i.e. with the disclosed method she can delegate most of the work to Bob).

For example, let $k \sim m \sim 2^{2048}$. To compute $x^k$ for some $x \in \mathbb{Z}_m$ using the "square-and-multiply" method, one would need to do between log (k)~2048 and log (k) log log (k)~20,000 multiplications, i.e., about 10,000 multiplications on average (not counting reductions modulo m). By using the disclosed method with n=20, Alice would instead only need to do under 40 multiplications. Note that with n=20 the number of decoys would be roughly $10^8$ so the probability of guessing the message x is approximately $10^{-8}$ which can be considered negligible for most practical purposes.

Computation Time

A comparison was made concerning the performance time of the disclosed method versus the standard "square-and-multiply" method on a typical desktop computer. Table 2 provides the number N of exponentiations performed; that is N element, x and N exponents k were selected and $x^k$ was computed for each selection. More specifically, x was selected uniformly randomly in the range $[1, 2^{2048}]$ while k was selected uniformly randomly in the range $$\left[\frac{m}{10}, m\right]$$

where m is the RSA-2048 number.

TABLE 2

| # exponentiations N | With delegation (sec.) | By square-and-multiply (sec.) |
|---|---|---|
| 1 | 0.000359058 | 0.044971 |
| 10 | 0.00320983 | 0.450576 |
| 20 | 0.00540471 | 0.906645 |
| 30 | 0.0109916 | 1.35608 |
| 40 | 0.0145242 | 1.801 |
| 50 | 0.0167658 | 2.25128 |
| 100 | 0.0353656 | 4.50611 |

The second column in Table 2 shows the total time to do all the N exponentiations with the disclosed method. The third column in Table 2 shows the total time to do the same N exponentiations with the "square-and-multiply" method. In all experiments the number n of elements $x_i$ generated by Bob was 50 and the number r of those $x_i$ selected by Alice was random number between 1 and 11=log log (k). In particular, Alice had to do at most 22 multiplications. The experiments were carried out on a GATEWAY™ DX4300 desktop computer with an AMD Phenom™ II X4 820 2.80 GHz processor with 6HB of RAM running Ubuntu version 12.04 and Python 2.7. The total time to perform the RSA-2048 encryption was just under one second (on average) which is suitable for practical application. The sender's share in this total time is a mere 0.0003 seconds. In one embodiment, the method is complete in a total time of less than two seconds and the sending party's share in the time is less than 5% of this total time.

Arbitrary Monomials

The process may be generalized to arbitrary monomials. While there are optimizations that can be done depending on a specific monomial (for instance $44=(x_1 x_2)^k$) in the worst case scenario it may be fastest to compute the power of each variable separately and then multiply them out. Even in this case, Alice still goes logarithmically many computations compared to what she would have to do without Bob's help.

For example, if Alice were to evaluate a monomial $x_1^{k_1} \ldots x_r^{k_r}$ without the aid of delegating computation. Alice would then evaluate each separately by using the "square-and-multiply" method and then multiply out these powers. The number of multiplications in such a computation would be $O(r \log (K))$ where $K = \max k_i$. In contrast, the disclosed method yields the number of multiplications equal to $O(r \log \log (K))$.

Alice does logarithmically many multiplications with the disclosed method compared to what she would do with the "square-and-multiply" method. To formalize the meaning of "logarithmically many" in this context, a function $g(x)$ is logarithmically compare to $f(x)$ if equation (3) is true. Equation (3):

$$\lim_{x \to \infty} \frac{\log(f(x))}{g(x)} < \infty$$

The function $r \log \log (K)$ can be shown to be logarithmic compared to $r \log (K)$ where $r$ is constant according to equation (4). Equation (4):

$$\lim_{K \to \infty} \frac{\log(r\log(K))}{r\log\log(K)} = \lim_{K \to \infty} \frac{\log(r) + \log\log(K)}{r\log\log(K)} = \lim_{K \to \infty} \frac{\log(r)}{r\log\log(K)} + \frac{1}{r} < \infty$$

In another example, if Alice were to evaluate a monomial $x_1^{k_1} x_2^{k_2} \ldots x_n^{k_n}$ without revealing $x_i$. A number S exists such that all $k_i$ mod S are between 0 and log S and that all $k_i \approx S$ log S. Evaluating $x_i^{k_1} x_2^{k_2} \ldots x_n^{k_n}$ can then be done as hereinafter described.

First, Alice chooses random invertible elements $d_1, d_2, \ldots d_{n-1}$ and then chooses a $d_n$ such that the product of all the $d_i$'s is 1. Second, Alice defines each $k_i$ as $k_i = e_i S + r_i$. This condition on $k_i$ imply that $e_i$ and $r_i$ are smell enough such that $x_i^{e_i}$ and $x_i^{r_i}$ are both efficient to compute compared to $x_i^{k_i}$. Third, Alice transmits to Bob $x_i^{e_i} d_i$ for all I and requests that they each be raised to the power of S, multiplied together and returned. The final product is $(x_1^{e_1} d_1)^S (x_2^{e_2} d_2)^S \ldots (x_n^{e_n} d_n)^S$ which is equal to $x_1^{e_1 S} \ldots x_n^{e_n S}$. Alice then multiplies the product by $x_i^{r_i}$ for all i to obtain the final result.

Verification of Computations

In some scenarios of delegating computation Alice may verify that Bob performed the computation correctly. The following is one method for Alice to verify Bob's calculation. For Alice to verify that her computation was done correctly, Alice and Bob need only repeat certain steps of the method. More specifically, the following steps may be repeated. Alice re-chooses r' random elements $x_{\alpha_j}$ from the list of n elements $(x_i \ldots x_n)$ that were identified by Bob, wherein $1 \leq r' \leq \log \log(k)$ to produce a second list of randomly chosen elements for j ranges from 1 to r'. Alice re-computes $y' = x x_{\alpha_1}^{-1} x_{\alpha_2}^{-1} \ldots x_{\alpha_r}^{-1}$, and checks that $y' \neq y$. If $y' = y$, the step of re-choosing is repeated. If $y' \neq y$ then Alice sends y' to Bob. Bob encrypts y' with the key k to produce $(y')^k$. Alice receives $(y')^k$ from Bob. Alice encrypts the message x according to $x^k = \ldots x_{\alpha_1}^k \ldots x_{\alpha_r}^k (y')^k$.

To verify all the computations, Alice checks that both of her answers for $X^k$ are the same. Because Alice picks each subset herself, Bob cannot manipulate computations so that Alice gets the same false answer each time. More specifically, because Alice's choice of a subset results in a different y, if there were any incorrect computations done, the probability that Bob would find a correct $y^k$, other than by following the protocol, is negligible.

Also, because no information relevant to the x itself is transmitted by Alice throughout the protocol, executing the protocol several times does not reveal any formation about x. Based on the complexity analysis, Alice will still perform logarithmically many steps compared to Bob.

Figure 2:
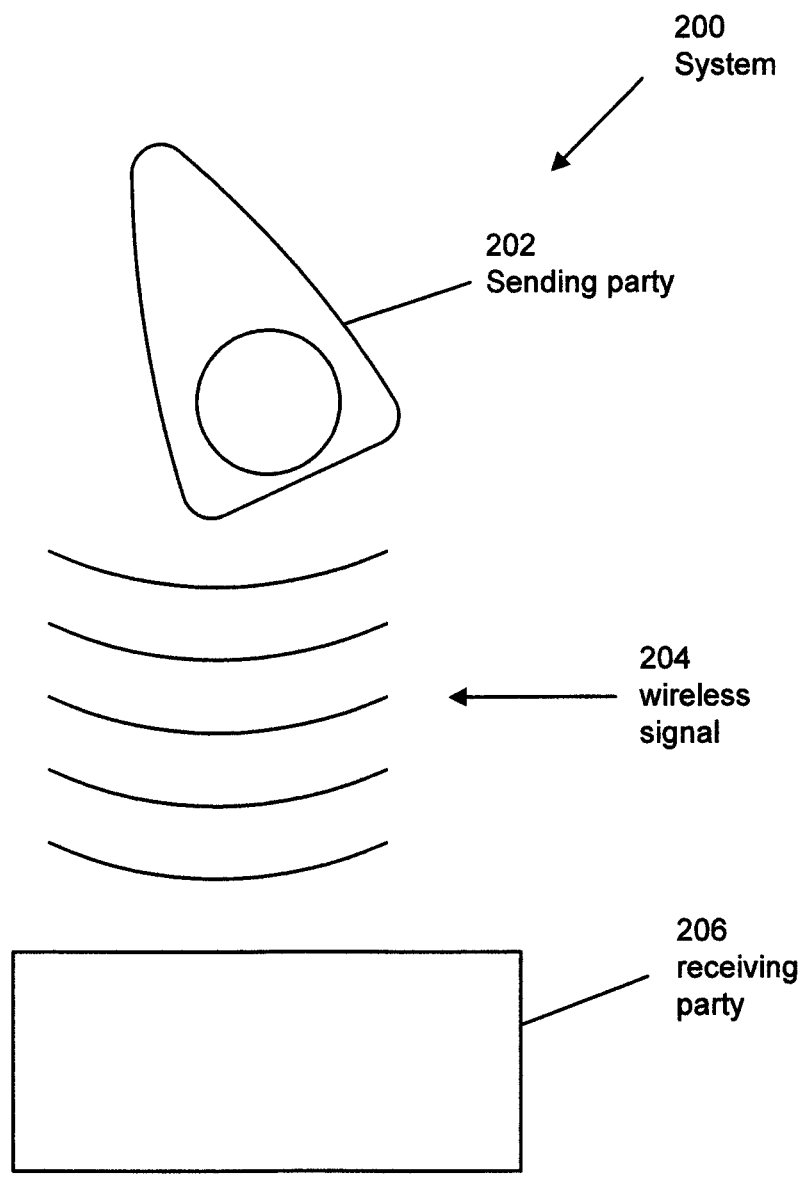
FIG. 2 is an example of a system that uses the disclosed method.

Referring to FIG. 2, a system 200 is depicted. The system 200 comprises a sending party 202 which, in the embodiment of FIG. 2, is an electronic key job. The sending party may be, for example, a radio frequency identification (RFID) tag, an electronic key fob, or a field-programmable gate array (FPGA). The sending party 202 sends or receives a signal, such as wireless signal 204, to a receiving party 206. The wireless signal 204 may be, for example, a radio frequency signal or infrared signal. The sending party 202 may actively transmit the wireless signal 204 or be a passive transponder. The receiving party 206 may be a sensor that detects and/or transmits the wireless signal 204. The receiving party may be, for example, a cloud-based processor, a remote server or an advanced processor. The receiving party has greater processing capability than the sending party. In another embodiment, not shown, the signal is wired.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transient computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for delegating computational burden between a sending party and a receiving party for encrypting a message x with a key k to produce an encrypted message $x^k$ where the message x is an element of a list of integers ($\mathbb{Z}_m$), the method comprising steps of:
    instructing the receiving party to identify n elements ($x_i \ldots x_n$) from the list of integers ($\mathbb{Z}_m$) having elements $x_1 \ldots x_m$, wherein n is greater than log log (k), greater than zero and is less than m, k is a key known by at least the receiving party that is greater than zero and less than m, wherein the step of instructing is performed by the sending party and the sending party is a radio frequency identification (RFID) tag;
    getting from the receiving party a list of the n elements ($x_i \ldots x_n$) that were identified;
    confirming, for each $x_i$, that $$\frac{m}{2n} \leq x_{i+1} - x_i \leq \frac{m}{n}$$

is satisfied;
    choosing r random elements $x_{i_j}$ from the list of the n elements ($x_i \ldots x_n$) that were identified, wherein $1 \leq r \leq \log \log(k)$ to produce a list of randomly chosen elements $1 \leq i_1, \ldots, i_r \leq n$;
    computing $y = xx_{i_1}^{-1} x_{i_2}^{-1} \ldots x_{i_r}^{-1}$ wherein $x_{i_1}^{-1} x_{i_2}^{-1} \ldots x_{i_r}^{-1}$;
    sending y to the receiving party;
    obtaining $y^k$ from the receiving party;
    encrypting the message x with the key k according to $x^k = x_{i_1}^k \ldots x_{i_r}^k y^k$ wherein $y^k$ was obtained by the sending party from the receiving party in the step of obtaining.

2. The method as recited in claim 1, wherein m is sent to the receiving party by the sending party such that the receiving party can perform the step of confirming.

3. The method as recited in claim 1, wherein the sending party performs 2n or fewer multiplications in $\mathbb{Z}_m$ to encrypt the message x, the receiving party performing more than 2n multiplications in $\mathbb{Z}_m$ to encrypt the message x.

4. The method as recited in claim 1, wherein n is between 10 and 30.

5. The method as recited in claim 1, wherein n is between 20 and 30.

6. The method as recited in claim 1, wherein the method is complete in a time of less than two seconds and the sending party's share in the time is less than 5%.

7. The method as recited in claim 1, further comprising verifying the receiving party correctly calculated $y^k$.

8. The method as recited in claim 7, where the step of verifying comprises the sending party performing steps of:
    choosing r' random elements $x_{\alpha_j}$ from the list of n elements ($x_i \ldots x_n$) that were identified by the receiving party, wherein $1 \leq r' \leq \log \log(k)$ to produce a second list of randomly chosen elements for j ranges from 1 to r';
    computing $y' = xx_{\alpha_1}^{-1} x_{\alpha_2}^{-1} \ldots x_{\alpha_{r'}}^{-1}$;
    wherein, if $y' \neq y$, sending y' to the receiving party and thereafter (a) receiving $(y')^k$ from the receiving party and (b) encrypting the message x according to $x^k = x_{\alpha_1}^k \ldots x_{\alpha_{r'}}^k (y')^k$;
    determining the receiving party correctly calculated $y^k$ if $x_{\alpha_1}^k \ldots x_{\alpha_{r'}}^k (y')^k = x_{\alpha_1}^k \ldots x_{\alpha_{r'}}^k (y)^k$.

9. A method for delegating computational burden between a sending party and a receiving party for encrypting a message x with a key k to produce an encrypted message $x^k$ where the message x is an element of a list of integers ($\mathbb{Z}_m$), the method comprising steps of:

instructing the receiving party to identify n elements ($x_1 \ldots x_n$) from the list of integers ($\mathbb{Z}_m$) having elements $x_1 \ldots x_m$, wherein n is greater than log log (k), greater than zero and is less than m, k is a key known by at least the receiving party that is greater than zero and less than m, wherein the step of instructing is performed by the sending party, wherein the sending party is selected from the group consisting of an electronic key fob, and a field-programmable gate array (FPGA);

getting from the receiving party a list of the n elements ($x_i \ldots x_n$) that were identified;

confirming, for each $x_i$, that $$\frac{m}{2n} \leq x_{i+1} - x_i \leq \frac{m}{n}$$

is satisfied;

choosing r random elements $x_{i_j}$ from the list of the n elements ($x_i \ldots x_n$) that were identified, wherein $1 \leq r \leq \log \log(k)$ to produce a list of randomly chosen elements $1 \leq i_1, \ldots, i_r \leq n$;

computing $y = x x_{i_1}^{-1} x_{i_2}^{-1} \ldots x_{i_r}^{-1}$ wherein $x_{i_1}^{-1} x_{i_2}^{-1} \ldots x_{i_r}^{-1}$;

sending y to the receiving party;

obtaining from the receiving party $y^k$;

encrypting the message x with the key k according to $x^k = x_{i_1}^k \ldots x_{i_r}^k y^k$ wherein $y^k$ was obtained by the sending party from the receiving party in the step of obtaining.

10. The method as recited in claim 9, wherein the sending party is an electronic key fob.

11. The method as recited in claim 9, wherein the sending party is a FPGA.

12. The method as recited in claim 9, wherein m is sent to the receiving party by the sending party such that the receiving party can perform the step of confirming.

13. The method as recited in claim 9, wherein the sending party performs 2n or fewer multiplications in $\mathbb{Z}_m$ to encrypt the message x, the receiving party performing more than 2n multiplications in $\mathbb{Z}_m$ to encrypt the message x.

14. The method as recited in claim 9, wherein n is between 10 and 30.

15. The method as recited in claim 9, wherein n is between 20 and 30.

16. The method as recited in claim 9, wherein the method is complete in a time of less than two seconds and the sending party's share in the time is less than 5%.

17. The method as recited in claim 9, further comprising verifying the receiving party correctly calculated $y^k$.

18. The method as recited in claim 17, where the step of verifying comprises the sending party performing steps of:

choosing r' random elements $x_{\alpha_j}$ from the list of n elements ($x_i \ldots x_n$) that were identified by the receiving party, wherein $1 \leq r' \leq \log \log(k)$ to produce a second list of randomly chosen elements for j ranges from 1 to r';

computing $y' = x x_{\alpha_1}^{-1} x_{\alpha_2}^{-1} \ldots x_{\alpha_{r'}}^{-1}$;

wherein, if $y' \neq y$, sending y' to the receiving party and thereafter (a) receiving $(y')^k$ from the receiving party and (b) encrypting the message x according to $x^k = x_{\alpha_1}^k \ldots x_{\alpha_{r'}}^k (y')^k$;

determining the receiving party correctly calculated $y^k$ if $x_{\alpha_1}^k \ldots x_{\alpha_{r'}}^k (y')^k = x_{\alpha_1}^k \ldots x_{\alpha_{r'}}^k (y)^k$.

19. The method as recited in claim 9, further comprising finding an inverse of $x \in \mathbb{Z}_m$.

\* \* \* \* \*